United States Patent

Shimamura

(10) Patent No.: US 9,874,876 B2
(45) Date of Patent: Jan. 23, 2018

(54) CONTROL APPARATUS FOR AUTONOMOUSLY NAVIGATING UTILITY VEHICLE

(71) Applicant: Honda Motor Co., Ltd., Tokyo (JP)

(72) Inventor: Hideaki Shimamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 15/016,176

(22) Filed: Feb. 4, 2016

(65) Prior Publication Data

US 2016/0231749 A1    Aug. 11, 2016

(30) Foreign Application Priority Data

Feb. 10, 2015    (JP) .................. 2015-024538

(51) Int. Cl.
G05D 1/00 (2006.01)
G05D 1/02 (2006.01)
A01D 34/00 (2006.01)

(52) U.S. Cl.
CPC ......... G05D 1/0265 (2013.01); A01D 34/008 (2013.01); G05D 2201/0208 (2013.01)

(58) Field of Classification Search
CPC ... G05D 1/0088; G05D 1/0212; G05D 1/0265
See application file for complete search history.

(56) References Cited

U.S. PATENT DOCUMENTS

| | | | |
|---|---|---|---|
| 2008/0183349 A1* | 7/2008 | Abramson | A01D 34/008 701/23 |
| 2013/0211648 A1* | 8/2013 | Yamamura | G05D 1/021 701/22 |
| 2014/0058611 A1* | 2/2014 | Borinato | G05D 1/0265 701/23 |

FOREIGN PATENT DOCUMENTS

WO    2012044220 A1    4/2012

* cited by examiner

*Primary Examiner* — Kimberly S Berona
*Assistant Examiner* — Anshul Sood
(74) *Attorney, Agent, or Firm* — Duft Bornsen & Fettig LLP

(57) ABSTRACT

In an apparatus for controlling operation of an autonomously navigating utility vehicle travelling about a working area delineated by a boundary wire, the working area including a narrow area and a broad area, there are provided with a magnetic field strength detector, a travel controlling unit controlling the vehicle to turn and travel straight forward every time the vehicle reaches the boundary wire based on the magnetic field strength, and a narrow area discriminating unit discriminating that the vehicle travels in the narrow area when the magnetic field strength is kept to be greater than a threshold value predefined based on a minimum value of the magnetic field strength in the narrow area from a first turn to a second turn of the vehicle, or for a predetermined time period after the first turn.

14 Claims, 12 Drawing Sheets

CONTROL APPARATUS FOR AUTONOMOUSLY NAVIGATING UTILITY VEHICLE

CROSS-REFERENCE TO RELATED APPLICATION

This application is based upon and claims the benefit of priority from Japanese Patent Application No. 2015-024538 filed on Feb. 10, 2015, the contents of which are incorporated herein by reference.

BACKGROUND OF THE INVENTION

Field of the Invention

This invention relates to a control apparatus for an autonomously navigating utility vehicle that autonomously navigates and performs lawn mowing and/or other tasks in a working area delineated by a boundary wire.

Description of Related Art

Among conventional control apparatuses for such an autonomously navigating utility vehicle are known ones that use a pair of sensors to detect magnetic field strength (intensity) generated by electric current passed through the boundary wire in advance and drive the utility vehicle within a working area including a narrow area based on difference between sensor detection values (see International Publication 2012/044220, for example)

In this regard, to enable the autonomously navigating utility vehicle to carry out work efficiently in the working area, it is necessary to ascertain the condition of a travel route and autonomously drive the utility vehicle in a manner suitable for the route. However, the control apparatus described in the reference merely drives the utility vehicle through the narrow area based solely on the difference in the values detected by the pair of sensors without ascertaining the condition of the travel route, so that it is impossible to efficiently carry out work in the working area with the control apparatus set out in the reference.

SUMMARY OF THE INVENTION

According to an aspect of the invention, there is provided an apparatus for controlling operation of an autonomously navigating turnable utility vehicle equipped with a body and a prime mover mounted on the body to make the vehicle travel about a working area delineated by a boundary wire laid thereat in order to work autonomously, the working area including a first area and a second area connected to the first area, a distance between mutually facing segments of the boundary wire in the first area being equal to or less than a predetermined value over a predetermined length, a distance between mutually facing segments of the boundary wire in the second area being greater than the predetermined value, comprising: a magnetic field strength detector installed on the body to detect a magnetic field strength generated by electric current passing through the boundary wire; a travel controlling unit configured to control the prime mover to make the vehicle turn and travel straight forward every time the vehicle traveling in the working area reaches the boundary wire, based on the magnetic field strength detected by the magnetic field strength detector; and a first area discriminating unit configured to discriminate that the vehicle travels in the first area when the magnetic field strength detected by the magnetic field strength detector is kept to be greater than a threshold value predefined based on a minimum value of the magnetic field strength in the first area for a first time period from a first turn to a second turn of the vehicle, or when the magnetic field strength detected by the magnetic field strength detector is kept to be greater than the threshold value for a predetermined time period after the first turn.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
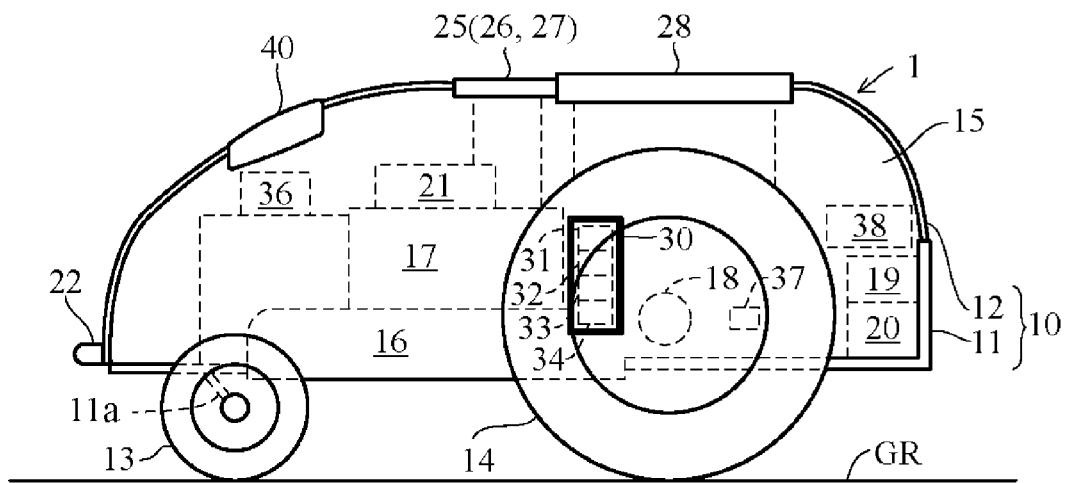
FIG. 1 is a side view schematically illustrating configuration of an autonomously navigating utility vehicle according to an embodiment of this invention.

An embodiment of the present invention is explained with reference to FIGS. 1 to 19 in the following. FIG. 1 is a side view schematically illustrating the configuration of an autonomously navigating utility vehicle according to an embodiment of the present invention, and FIG. 2 is plan view of the same.

The autonomously navigating utility vehicle of the present invention can be embodied in the form of various types of utility vehicle and particularly as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

Figure 2:
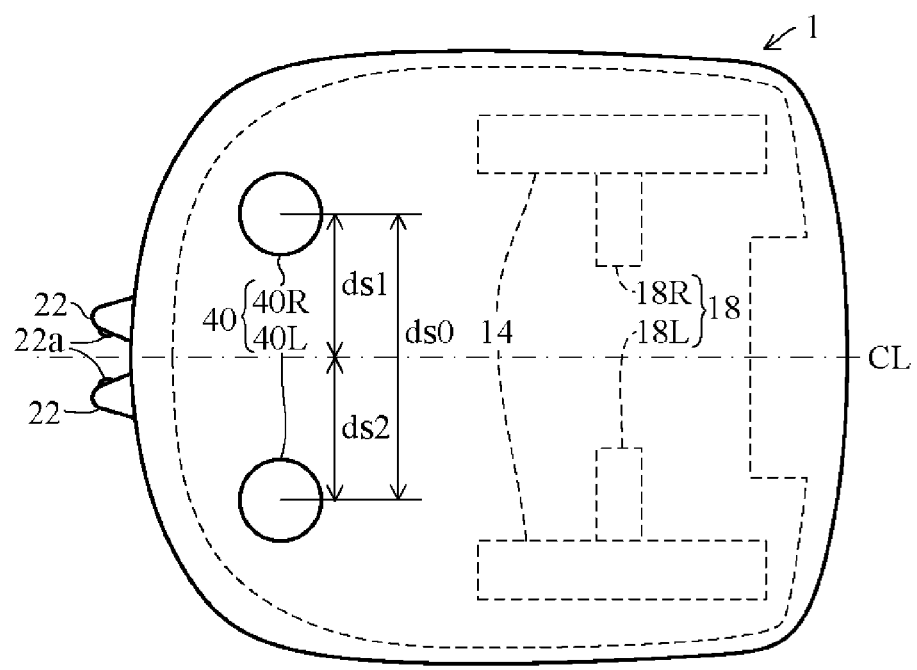
FIG. 2 is a plan view schematically illustrating the configuration of the utility vehicle according to the embodiment.

As shown in FIGS. 1 and 2, an autonomously navigating utility vehicle (hereinafter called simply "vehicle") 1 is equipped with a body 10 having a chassis 11 and a frame 12, along with a pair of left and right front wheels 13 and a pair of left and right rear wheels 14 that support the body 10 above a ground surface GR so as to be capable of travel.

The front wheels 13 are rotatably fastened through stays 11a to the front end of the chassis 11. The rear wheels 14, which are greater in diameter than the front wheels 13, are rotatably fastened directly to the rear end of the chassis 11. The weight and size of the vehicle 1 are such that it can be transported by an operator. As an example can be cited a vehicle 1 whose total length (forward-rearward direction length) is about 500 mm, total width about 300 mm, and height about 300 mm.

A work unit 16, a work motor 17 for driving the work unit 16, travel motors (prime mover) 18 for driving the rear wheels 14, a battery charging unit 19, a battery 20 and a housing box 30 are deployed in an internal space 15 of the vehicle 1 enclosed by the chassis 11 and the frame 12.

The work unit 16 comprises a rotor and blades attached to the rotor and has a substantially disk-like shape as a whole. A rotating shaft is installed vertically at the center of the rotor and the work unit 16 is configured to enable adjustment of the height of the blades above the ground GR through a height regulating mechanism 21 by the operator. The height regulating mechanism 21 is equipped with, for example, a screw operable by the operator. The work motor 17 is constituted by an electric motor installed above the work unit 16, and an output shaft thereof is connected to the rotating shaft of the rotor to rotate the blades unitarily with the rotor.

The travel motors 18 comprise a pair of electric motors 18L and 18R installed on the right and left inner sides of the left and right rear wheels 14. Output shafts of the travel motors 18L and 18R are connected to rotating shafts of the left and right rear wheels 14, respectively, so as each to independently drive to rotate the left or right rear wheel 14. In other words, the vehicle 1 comprises the front wheels 13 as non-driven free wheels and the rear wheels 14 as driving wheels, and the travel motors 18L and 18R each independently rotates one of the rear wheels 14 normally (rotation to move forward) or reversely (rotation to move reverse). By establishing a difference between the rotating speeds of the left and right rear wheels 14, the vehicle 1 can be turned to an arbitrary direction.

For example, when the left and right rear wheels 14 are both rotated normally and the rotational speed of the right rear wheel 14 is greater than the rotational speed of the left rear wheel 14, the vehicle 1 turns left at a turning angle θ in accordance with the speed difference. Conversely, when the rotational speed of the left rear wheel 14 is greater than the rotational speed of the right rear wheel 14, the vehicle 1 turns right at a turning angle θ in accordance with the speed difference. When one of the left and right rear wheels 14 is rotated normally and the other reversely both at the same speed, the vehicle 1 turns on the spot.

The charging unit 19, which includes an AC-DC converter, is connected by wires to charging terminals 22 provided at the front end of the frame 12 and is also connected by wires to the battery 20. The charging terminals 22 have contacts 22a, and the battery 20 can be charged by connecting the charging terminals 22 through the contacts 22a to a charging station 3 (see FIG. 3). The battery 20 is connected through wires to the work motor 17 and the travel motors 18, and the work motor 17 and the travel motors 18 are driven by power supplied from the battery 20. The voltage of the battery 20 is detected by a voltage sensor (not shown).

The housing box 30 is installed near the middle of the vehicle 1. A printed circuit board 30a (see FIG. 6) deployed inside the housing box 30 has an Electronic Control Unit (ECU) 31, an angular velocity sensor (turning angle sensor) 32, an acceleration sensor 33, and a temperature sensor 34 implemented thereon.

The ECU 31 has a microcomputer of a configuration including an arithmetic processing unit (CPU) and memories ROM, RAM and other peripheral circuits. The angular velocity sensor 32 produces an output indicating angular velocity occurring around a height direction (z-axis) of the vehicle 1. The turning angle θ of the vehicle 1 around the z-axis can be calculated based on the output of the angular velocity sensor 32. The acceleration sensor 33 produces an output indicating acceleration acting on the vehicle 1 in the directions of three orthogonal axes (x-axis, y-axis, and z-axis).

The vehicle 1 is additionally equipped with a contact sensor 36, a pair of wheel speed sensors (travel distance detector) 37, a lift sensor 38, operation switches 25, a display 28, and magnetic field strength detectors 40.

The contact sensor 36 produces an output of ON signal when the frame 12 is detached from the chassis 11 owing to contact with an obstacle or the like. Each of the pair of wheel speed sensors 37 produces an output indicating wheel speed of one of the left and right rear wheels 14. The output of the wheel speed sensors 37 can be used to calculate the travel distance of the vehicle 1. The lift sensor 38 produces an output of ON signal when the frame 12 is lifted off the chassis 11. The operation switches 25 provided to be manipulated by the operator, include a main switch 26 for commanding, inter alia, start of vehicle 1 operation, and an emergency stop switch 27 for stopping the vehicle 1 in an emergency. The display 28 shows various information to be supplied to the operator. The magnetic field strength detectors 40 produce outputs indicating magnetic field magnitude strength (intensity) H.

In the present embodiment, the two magnetic field strength detectors 40 (i.e., 40R and 40L) are installed laterally spaced apart on the front end of the vehicle 1. More specifically, as shown in FIG. 2, the two magnetic field strength detectors 40R and 40L are installed laterally symmetrically with respect to a center line CL running in the straight forward direction along the widthwise center of the vehicle 1. Therefore, where the distance between the magnetic field strength detectors 40R and 40L is defined as ds0, the distances ds1 and ds2 of the magnetic field strength detectors 40R and 40L from the center line CL are both ds0/2 and thus equal. Owing to their identical configuration, the outputs of the magnetic field strength detectors 40R and 40L become identical to each other when exposed to the same magnetic field.

Figure 3:
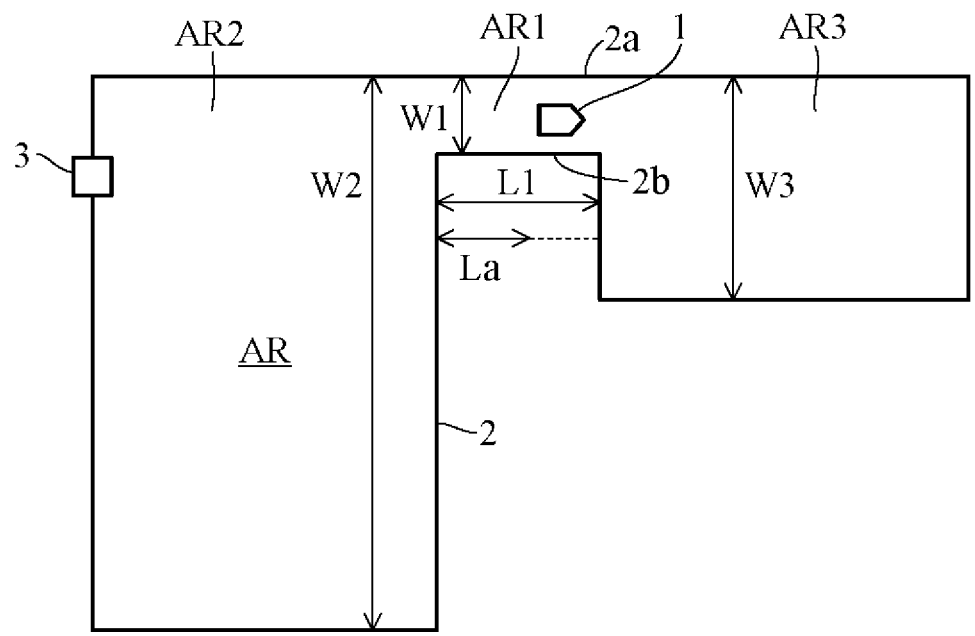
FIG. 3 is a diagram showing an example of a working area to be serviced by the utility vehicle according to the embodiment.

The vehicle 1 configured as set out above autonomously navigates within a predefined working area. FIG. 3 shows an example of a working area AR. The working area AR is delineated by a boundary wire 2 laid beforehand (e.g., buried a predetermined depth under the ground surface GR). A magnetic field is generated in the working area AR by passing electric current through the boundary wire 2. The charging station 3 for charging the battery 20 is situated above the boundary wire 2. The working area AR defines the travel range of the vehicle 1 and may include not only area(s) to be serviced but also area(s) not to be serviced.

As shown in FIG. 3, the working area AR includes a narrow (first) area AR1 and a broad (second) areas or areas AR2, AR3 connected to the narrow area AR1. For example, where the lot of a building has the broad area AR2 as a frontyard and the broad area AR3 as a backyard, a corridor connecting the frontyard and backyard corresponds to the narrow area AR1. In the narrow area AR1, distance (area width) W1 between mutually facing segments or portions 2a and 2b of the boundary wire 2 is equal to or less than a predetermined value Wa, and length L1 perpendicular to area width W1 is equal to or greater than a predetermined length La. When the area width is W2 or W3 greater than the predetermined value Wa, the area is the broad area AR2 or AR3. The predetermined value Wa is, for example, about 5 to 10 times the overall width of the vehicle 1, or around 1 meter, and the predetermined length La is, for example, about 1 to 2 times the overall length of the vehicle 1.

Figure 4:
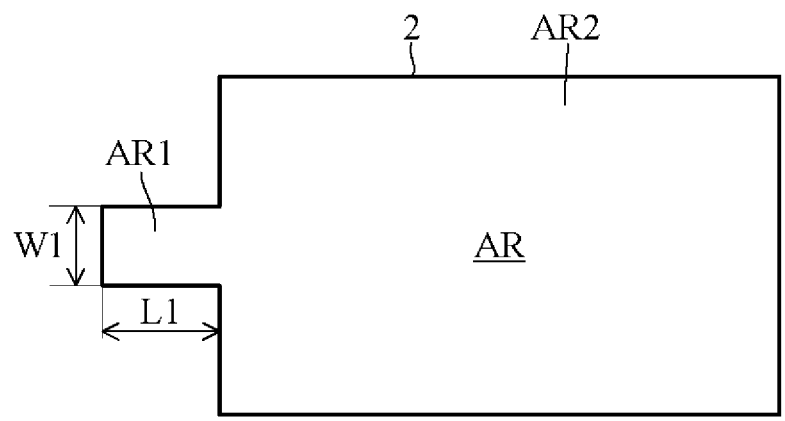
FIG. 4 is a diagram, similar to FIG. 3, but showing a variation of a working area illustrated in FIG. 3.

Although in FIG. 3 opposite ends of the narrow area AR1 are connected to the broad areas AR2 and AR3, a case where only one end is connected is included in the definition of a narrow area AR1. For example, even a case where, as shown in FIG. 4, one end is connected to the broad area AR2 and the other end is blocked by the boundary wire 2, constitutes a narrow area AR1 insofar as the area width W1 is equal to or less than the predetermined value Wa over the predetermined length La.

Figure 5:
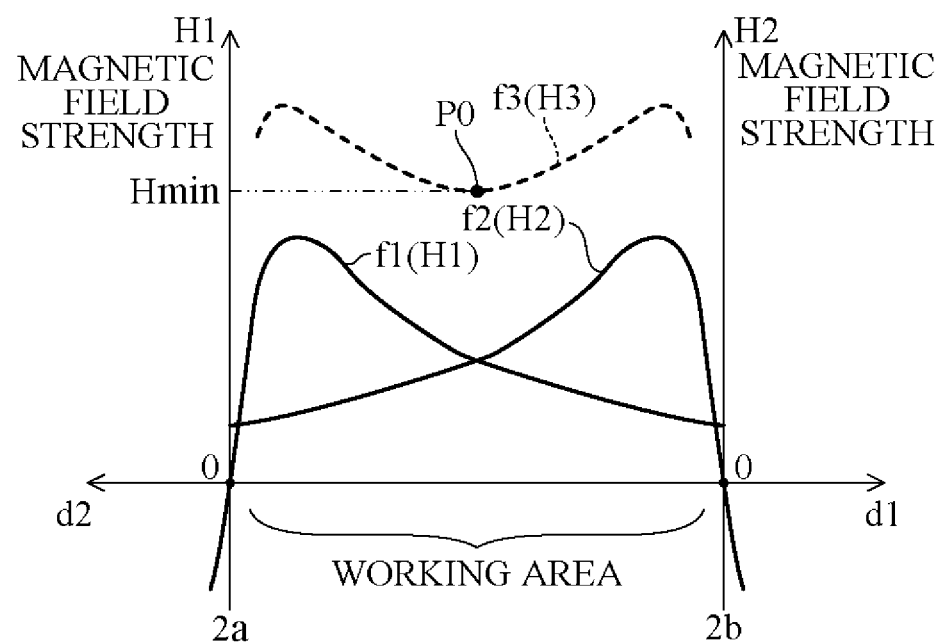
FIG. 5 is a diagram showing a variation of magnetic field strength along a width direction of a narrow area illustrated in FIG. 3.

Electric current passing through the boundary wire 2 generates a magnetic field in the working area AR. FIG. 5 is a diagram showing variation of magnetic field strength (intensity) H along the width direction of the narrow area AR1. The horizontal axis in FIG. 5 is distance d1 from the wire segment 2a to the wire segment 2b, and distance d2 from the wire segment 2b to the wire segment 2a. Characteristic f1 indicates magnetic field strength H1 generated by current passing through the wire segment 2a, and characteristic f2 indicates magnetic field strength H2 generated by current passing through the wire segment 2b.

The magnetic field strengths H1 and H2 both vary with distances d1 and d2 from the boundary wire 2. Specifically, magnetic field strength H1 is 0 above the wire segment 2a, positive inside the working area AR sandwiched between the wire segments 2a and 2b, and negative outside thereof. Magnetic field strength H2 is 0 above the wire segment 2b, positive inside the working area AR, and negative outside thereof.

Inside the working area AR, magnetic field strength H1 first rises sharply with increasing distance d1 from the wire segment 2a and then falls gradually. Similarly, magnetic field strength H2 first rises sharply with increasing distance d2 from the wire segment 2b and then falls gradually. The range within which magnetic field strength H1 rises from 0 and the range within which magnetic field strength H2 rises from 0 (peaking ranges) are narrow and shorter than the distance ds0 between the magnetic field strength detectors 40R and 40L.

Overall magnetic field strength H3 in the working area AR sandwiched between the pair of wire segments 2a, 2b is obtained by adding magnetic field strength H2 generated by the wire segment 2b to magnetic field strength H1 generated by the wire segment 2a. Characteristic f3 (dashed line) in FIG. 5 indicates total magnetic field strength H3 (=H1+H2) obtained by adding magnetic field strength H1 and magnetic field strength H2. As the wire segment 2a and the wire segment 2b carry currents in opposite directions, the magnetic field in the working area AR is strengthened, so that total magnetic field strength H3 (characteristic f3) is greater than the magnetic field strengths H1 and H2 (characteristics f1 and f2).

Disregarding the peaking ranges where the magnetic field strengths decline sharply near the wire segments 2a and 2b, total magnetic field strength H3 is minimum, i.e., assumes minimum magnetic field strength Hmin, near a midway point P0 between the wire segment 2a and the wire segment 2b. Minimum magnetic field strength Hmin is greater in proportion as the distance between the wire segments 2a and 2b (area width W) is shorter. This means that the minimum value of total magnetic field strength H3 (minimum magnetic field strength Hmin) in the narrow area AR1 is greater than the minimum values of total magnetic field strengths H3 in the broad areas AR2 and AR3. So in the present embodiment, whether the vehicle 1 is traveling in a narrow area is discriminated based on the minimum magnetic field strength Hmin as explained later.

Figure 6:
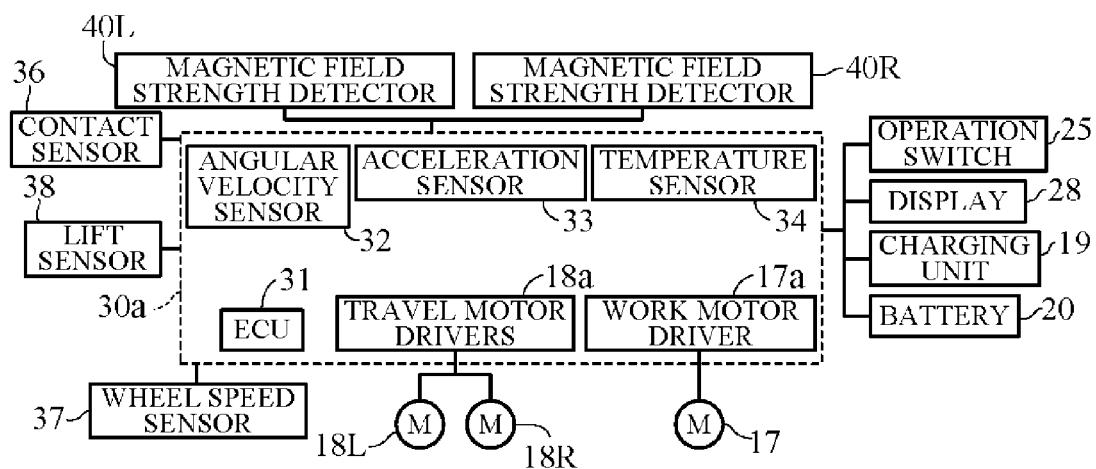
FIG. 6 is a block diagram showing configuration of a control apparatus for the utility vehicle according to the embodiment.

FIG. 6 is a block diagram showing the configuration of the control apparatus for an autonomously navigating utility vehicle in accordance with the embodiment of the present invention. As shown in FIG. 6, the printed circuit board 30a has the ECU 31, the angular velocity sensor 32, the acceleration sensor 33, the temperature sensor 34, a work motor driver 17a, and travel motor drivers 18a implemented thereon. In addition, the contact sensor 36, wheel speed sensors 37, lift sensor 38, pair of magnetic field strength detectors 40R and 40L, operation switches 25, display 28, battery charging unit 19, battery 20, work motor 17, and pair of travel motors 18L and 18R are connected to the printed circuit board 30a.

The outputs produced from the angular velocity sensor 32, acceleration sensor 33, temperature sensor 34, contact sensor 36, wheel speed sensors 37, lift sensor 38, magnetic field strength detectors 40L and 40R, and operation switches 25 are inputted to the ECU 31. The ECU 31 performs predetermined processing based on these sensor outputs in accordance with programs prepared beforehand and memorized in the memory (ROM), and outputs control commands to the work motor 17 through the work motor driver 17a and to the travel motors 18L and 18R through the travel motor drivers 18a.

Figure 7:
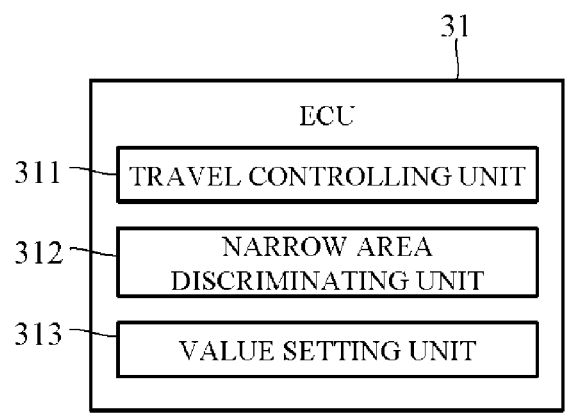
FIG. 7 is a block diagram showing functional configuration of an ECU shown in FIG. 6.

FIG. 7 is a block diagram showing part of the functional configuration of the ECU 31, particularly the functional configuration related to travel control. The ECU 31 has a travel controlling unit 311, a narrow area discriminating unit 312 and a value setting unit 313.

The travel controlling unit 311 control operation of the travel motor 18 by outputting a control command to the travel motors 18 through the travel motor drivers 18a to control travel activity of the vehicle 1 in the working area AR. The travel controlling unit 311 drives the vehicle 1 in different modes between before it has been discriminated that the vehicle 1 travels the narrow area, more precisely travels in the broad area (before narrow area travel confirmation) and after it has been discriminated that it travels in the narrow area (after narrow area travel confirmation).

Specifically, the travel controlling unit 311 drives the vehicle 1 in the broad areas AR2 and AR3 in ordinary work mode before confirmation of narrow area travel and drives the vehicle 1 in the narrow area AR1 in narrow area work mode after confirmation of narrow area travel. Although omitted in the drawings, the ECU 31 has a work control unit that in both ordinary work mode and narrow area work mode outputs control commands through the work motor driver 17a to the work motor 17 so as to carry out work using the work unit 16 while concomitantly driving the vehicle 1.

Figure 8:
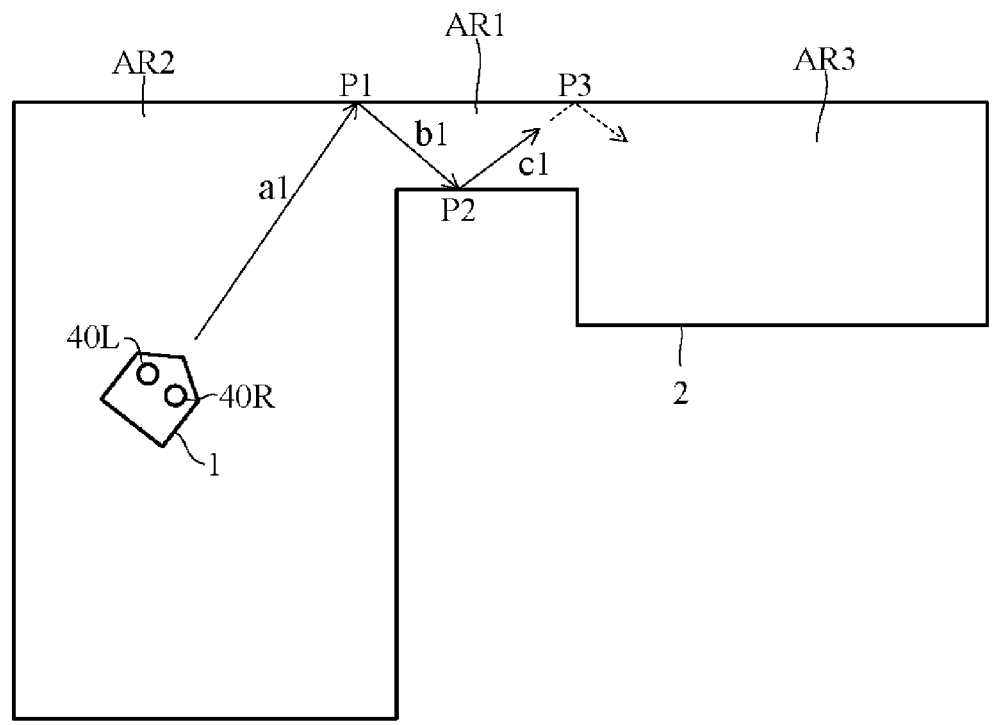
FIG. 8 is a diagram showing an example of a travel route of the utility vehicle in ordinary work mode.

FIG. 8 is a diagram showing an example of a travel route of the vehicle 1 in ordinary work mode. In ordinary work mode, as indicated by arrow a1 in FIG. 8, the travel controlling unit 311 drives the vehicle 1 straight forward at random (random driving) in the working area AR (mainly broad area AR2). At this time, the travel controlling unit 311 monitors magnetic field strengths H detected by magnetic field strength detectors 40L and 40R (sometimes called simply detected values H) and turns the vehicle 1 toward the inside of the working area AR as indicated by arrow b1 in FIG. 8 when the vehicle 1 reaches the boundary wire 2 (position P1 in FIG. 8) and detected value H of at least one of the magnetic field strength detectors 40L and 40R becomes 0 or less. When the vehicle 1 thereafter again reaches the boundary wire 2 (position P2 in FIG. 8) and the value detected by at least one of the magnetic field strength detectors 40L and 40R becomes 0 or less, the travel controlling unit 311 again turns the vehicle 1 toward the inside of the working area AR as indicated by arrow c1 in FIG. 8.

Figure 9:
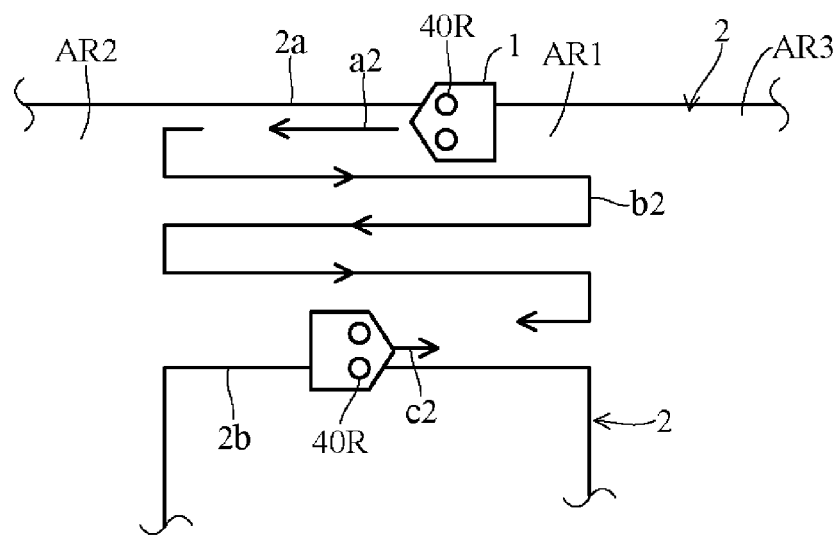
FIG. 9 is a diagram showing an example of a travel route of the utility vehicle in narrow area work mode.

FIG. 9 is a diagram showing an example of a travel route of the vehicle 1 in narrow area work mode. In narrow area work mode, the travel controlling unit 311 drives the vehicle 1 back and forth along the boundary wire 2, i.e., parallel to the boundary wire 2 (parallel driving). Specifically, as indicated by arrow 2a in FIG. 9, the travel controlling unit 311 first drives the vehicle 1 straight forward so that the magnetic field strength detector on the lateral outside (right magnetic field strength detector 40R in FIG. 9) travels above one of the mutually facing wire segments (wire segment 2a in FIG. 9), and concomitantly monitors detected value H of the right magnetic field strength detector 40R.

Next, as indicated by arrow b2 in FIG. 9, the travel controlling unit 311 drives the vehicle 1 back and forth within the narrow area AR1 while shifting (moving) it in the lateral direction of the area by a predetermined amount at the ends of the narrow area AR1, and when the vehicle 1 reaches the other wire segment 2b, the travel controlling unit 311 drives the vehicle 1 straight forward as indicated by arrow c2 in FIG. 9 so that the magnetic field strength detector on the lateral outside (right magnetic field strength detector 40R in FIG. 9) travels above the other wire segment (wire segment 2b in FIG. 9), and concomitantly monitors detected value H of the right magnetic field strength detector 40R.

Figure 10:
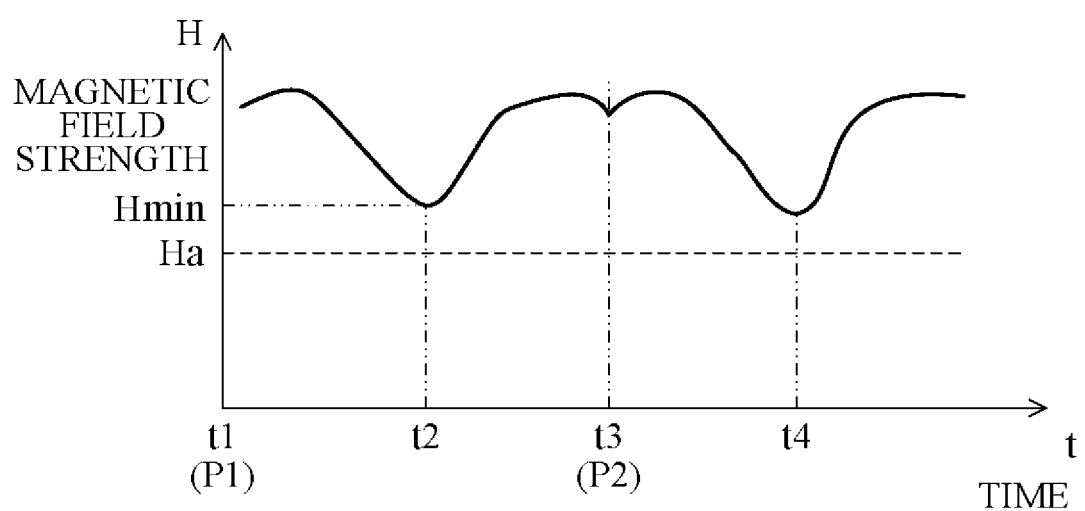
FIG. 10 is a diagram showing an example of magnetic field strength change when the utility vehicle moves along the travel route of FIG. 8.

The narrow area discriminating unit 312 discriminates whether the vehicle 1 travels in the narrow area AR1 based on detected values H of the magnetic field strength detectors 40L and 40R in ordinary work mode. FIG. 10 is a diagram showing an example of detected values (magnetic field strengths) H of the magnetic field strength detectors 40L and 40R when the vehicle 1 moved along arrow b1 and arrow c1 in FIG. 8. The horizontal axis is scaled for time t from position P1, and time t1 corresponds to position P1 in FIG. 8 and time t3 corresponds to position P2 in FIG. 8. The vertical axis indicates the smaller of detected values H of the magnetic field strength detectors 40L and 40R excluding detected values in the peaking range. The characteristic is also the same as in FIG. 10 when the vertical axis is scaled for outputs (voltages) of the magnetic field strength detectors 40L and 40R.

As seen in FIG. 10, magnetic field strength H falls as time proceeds from time point t1 to time point t2 and then rises toward time point t3. Therefore, at time point t2 magnetic field strength H becomes local minimum and minimum, so that minimum magnetic field strength Hmin of the narrow area AR1 is exhibited. Following time point t3, magnetic field strength H falls between time point t3 and time point t4 and thereafter rises with passage of time, so that it is also local minimum and minimum at time point t4. The narrow area discriminating unit 312 discriminates that the vehicle 1 travels in the narrow area when minimum magnetic field strength Hmin is greater than a predetermined threshold value Ha between turning of the vehicle 1 at position P1 and turning of the vehicle 1 at position P2.

The value setting unit 313 establishes the threshold value Ha to serve as a reference for narrow area discrimination and stores it in memory (RAM). The threshold value Ha is, for example, the average value of minimum magnetic field strength Hmin of the narrow area AR1 and maximum magnetic field strength of the broad areas AR2 and AR3. In the broad areas AR2 and AR3, facing regions of the boundary wire are thoroughly separated, so that magnetic field strength is nowhere reinforced and maximum magnetic field strength is produced by the boundary wire 2. For example, maximum values of the characteristic f1 and characteristic f2 in FIG. 5 are maximum magnetic field strengths of the broad areas AR2 and AR3. In this case, as shown in FIG. 5, minimum magnetic field strength Hmin is greater than these maximum magnetic field strengths.

Therefore, if the threshold value Ha is set to a value smaller than minimum magnetic field strength Hmin of the narrow area AR1 and greater than maximum magnetic field strength of the broad areas AR2 and AR3, the narrow area discriminating unit 312 can achieve accurate narrow area discrimination without risk of falsely determining the broad area AR2 or AR3 to be the narrow area AR1. Taking this point into consideration, in this embodiment the threshold value Ha is set at the average value of minimum magnetic field strength Hmin and maximum magnetic field strength.

Specifically, minimum magnetic field strength Hmin in the narrow area AR1 and maximum magnetic field strength in the broad areas AR2 and AR3 are measured experimentally or calculated by simulation or the like in advance. The value setting unit 313 then calculates the average value of minimum magnetic field strength Hmin and maximum magnetic field strength as the threshold value Ha. Setting can also be carried out by the operator inputting the threshold value Ha and the value setting unit 313 storing it in memory. The value setting unit 313 sets not only the threshold value Ha but also a reference value B1 serving as a reference of parallel driving of the vehicle 1 after narrow area discrimination.

Figure 11:
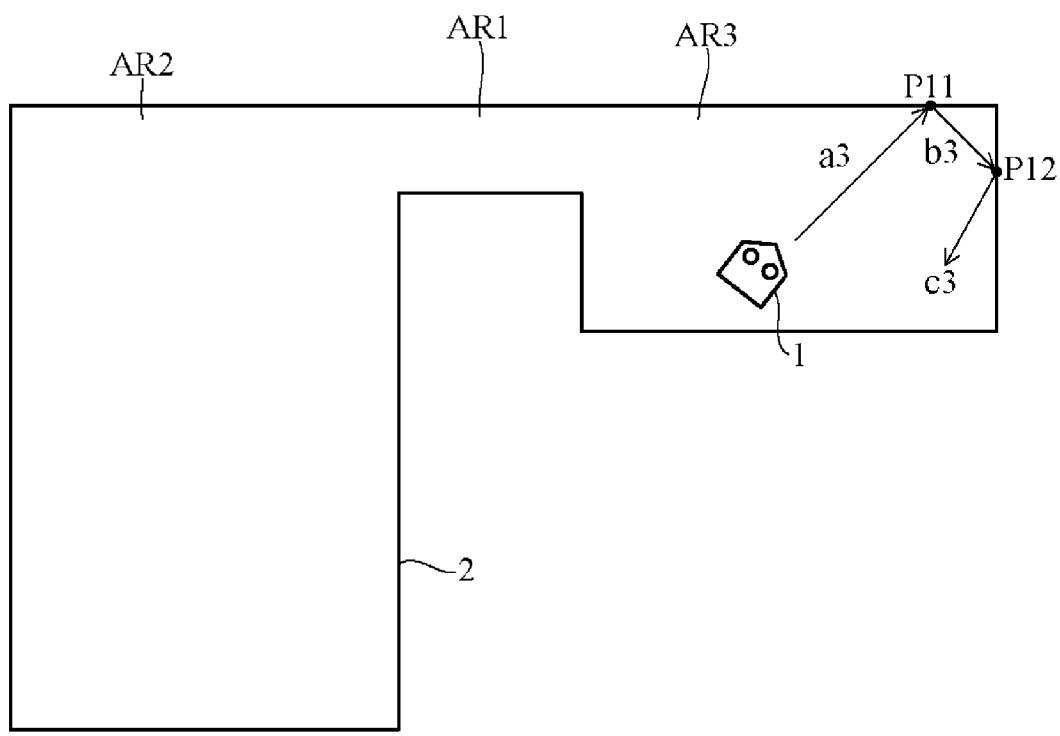
FIG. 11 is a diagram showing an example of a travel route of the utility vehicle in ordinary work mode.
Figure 12:
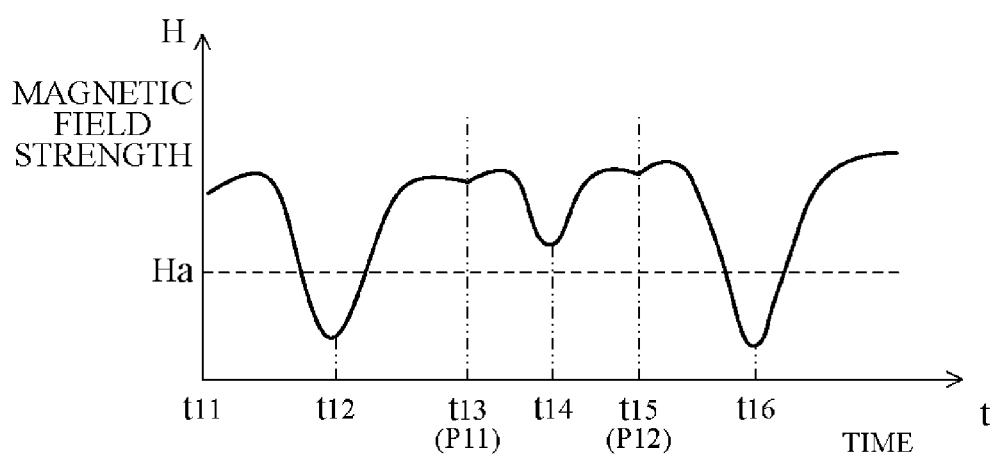
FIG. 12 is a diagram showing a variation of magnetic field strength when the utility vehicle moves along the travel route of FIG. 11.

In this regard, also when the vehicle 1 passes through a corner region of the broad area AR2 or AR3, minimum magnetic field strength Hmin sometimes becomes greater than the threshold value Ha between turns. FIG. 11 is a diagram showing an example of a travel route of the vehicle 1 in the broad area AR3, and FIG. 12 is a diagram showing variation of magnetic field strength H at that time. In FIG. 11, the vehicle 1 traveling straight forward (random travel) in the broad area AR3 turns at position P11 near a corner of the boundary wire 2 and turns again at position P12.

Time point t13 and time point t15 in FIG. 12 correspond to position P11 and position P12 in FIG. 11. As shown in FIG. 12, when the vehicle 1 is traveling along arrow a3 (FIG. 11) (time point t11 to time point t13), magnetic field strength H becomes smallest at time point t12, and minimum magnetic field strength Hmin at time point t12 is smaller than the threshold value Ha. On the other hand, when the vehicle 1 is traveling along arrow b3 (time point t13 to time point t15), minimum magnetic field strength Hmin at time point t14 is greater than the threshold value Ha because distance from position p11 to position P12 is short. When the vehicle 1 is traveling along arrow c3 (time point t15 onward), magnetic field strength is smallest at time point t16 and minimum magnetic field strength Hmin at time point t16 is smaller than the threshold value Ha.

Thus when the vehicle 1 is traveling in a corner region of the boundary wire 2, minimum magnetic field strength Hmin becomes greater than the threshold value Ha in the straight travel section between position P1 and position P2 (FIG. 8) but minimum magnetic field strength Hmin does not become greater than the threshold value Ha successively in two consecutive straight travel sections. Taking this point into consideration, in this embodiment the narrow area discriminating unit 312 discriminates that the vehicle 1 travels in the narrow area when minimum magnetic field strength Hmin is determined to be greater than the threshold value Ha in each of two consecutive straight travel sections such as from position P1 to position P2 and from position P2 to position P3 in FIG. 8. This makes it possible to enhance narrow area discrimination accuracy. Although the vehicle 1 makes turns one after another at positions P1, P2 and P3 in FIG. 8, these are sometimes called first turn, second turn and third turn.

Figure 13:
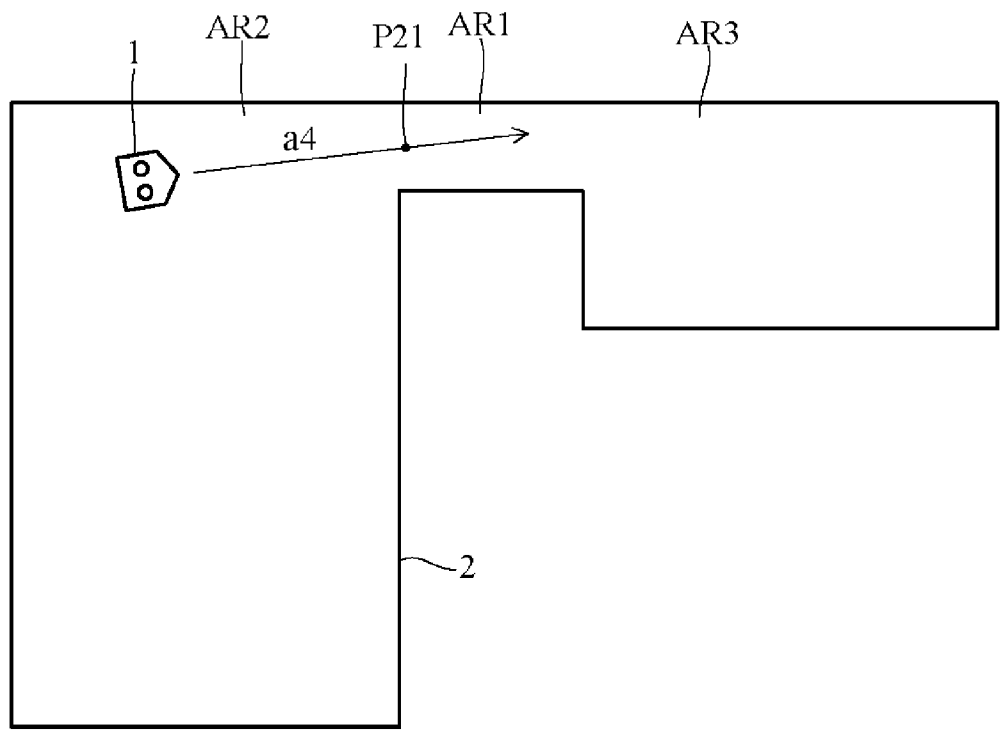
FIG. 13 is a diagram showing another example of a travel route of the utility vehicle in the ordinary work mode.
Figure 14:
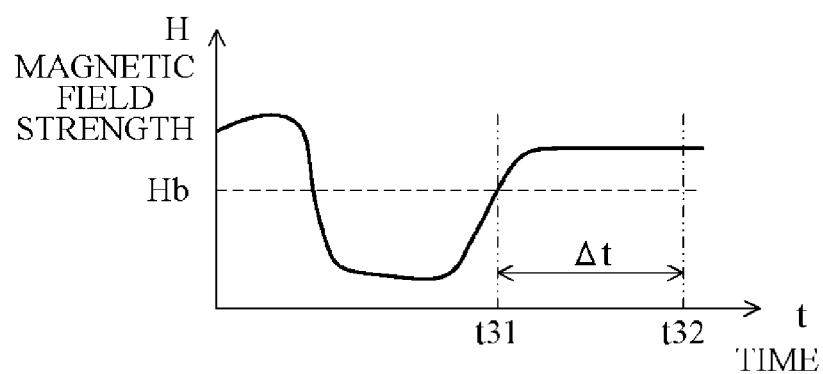
FIG. 14 is a diagram showing a variation of magnetic field strength when the utility vehicle moves along the travel route of FIG. 13.

FIG. 13 is a diagram showing an example of a travel route of the vehicle 1 in the broad area AR2, and FIG. 14 is a diagram showing variation of magnetic field strength H at that time. In FIG. 13, the vehicle 1 traveling straight forward along arrow a4 (random travel) in the broad area AR2 enters the narrow area AR1 at position P21 in a direction nearly parallel to the longitudinal direction of the narrow area. In this case, the vehicle 1 does not turn in the narrow area AR1, so that it may be impossible to determine narrow area travel by discrimination based on minimum magnetic field strength Hmin during straight forward travel between turns.

In the present embodiment, therefore, the narrow area discriminating unit 312 discriminates whether magnetic field strength H detected by the magnetic field strength detectors 40L and 40R has continued to be greater than a threshold value Hb for a predetermined time period Δt or greater, and when it has, the narrow area discriminating unit 312 discriminates that the vehicle 1 travels the narrow area. Specifically, as shown in FIG. 14, when the vehicle reaches position 21, magnetic field strength H becomes greater than the threshold value Hb at time point t31, but the narrow area discriminating unit 312 discriminates that the vehicle 1 travels in a narrow area at time point t32 when this condition has continued for the predetermined time period Δt. The threshold (second threshold) value Hb can be equal to the threshold (first threshold) value Ha or be greater or smaller than the threshold value Ha.

Figure 15:
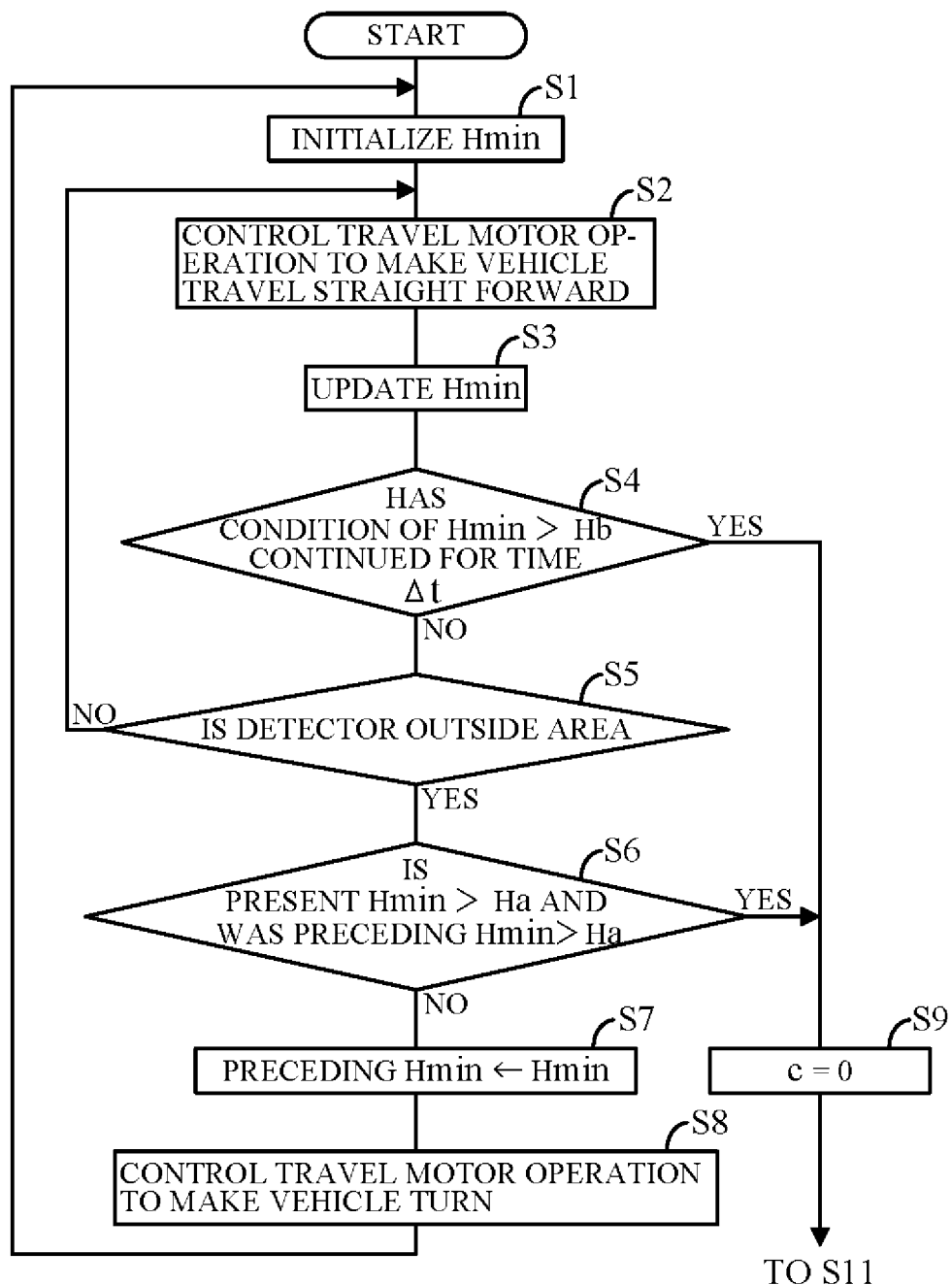
FIG. 15 is a flowchart showing an example of processing (processing related to narrow area discrimination) executed by the ECU shown in FIG. 7.
Figure 16:
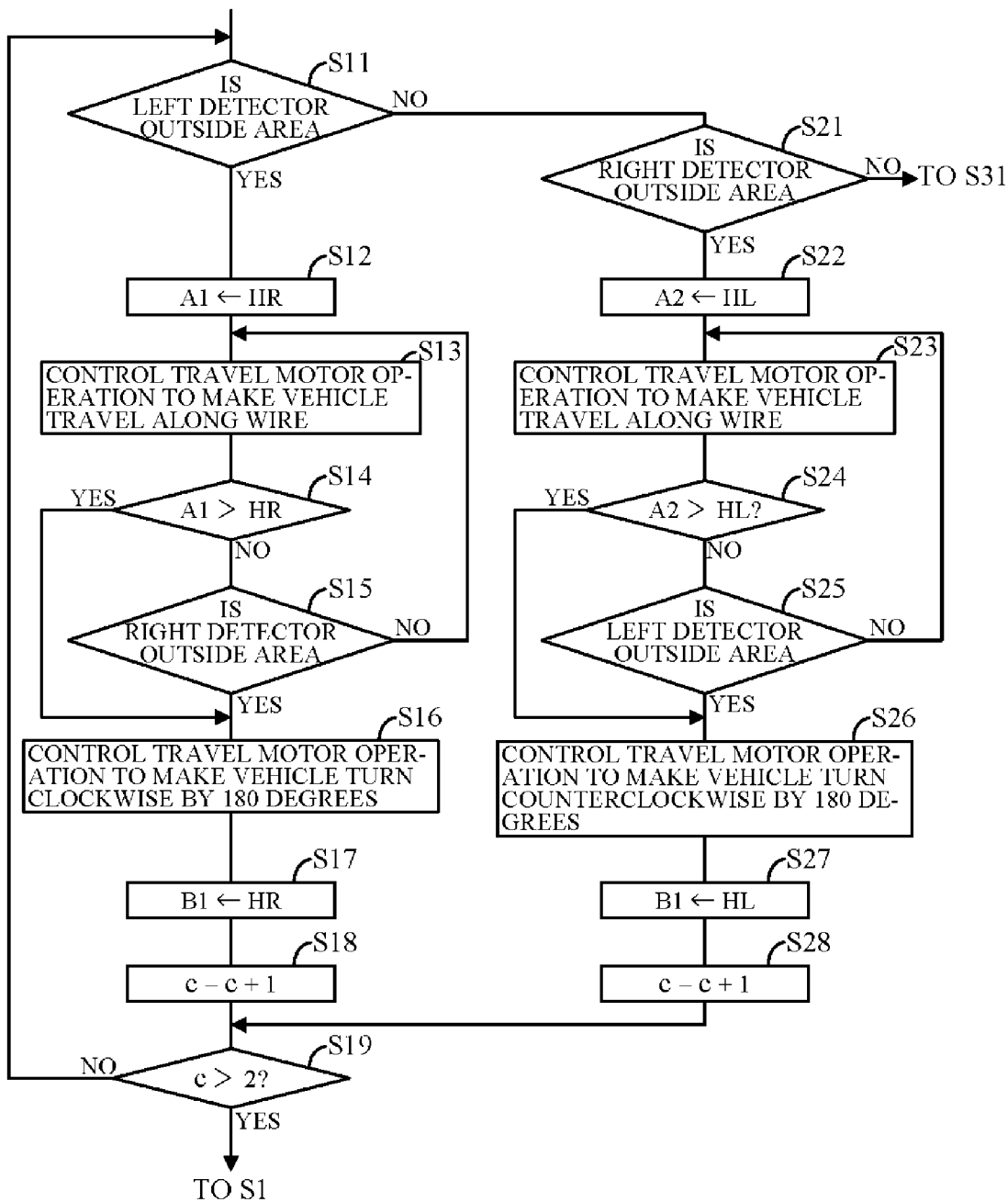
FIG. 16 is a first half of a flowchart showing an example of processing (processing related to parallel driving) executed by the ECU shown in FIG. 7.
Figure 17:
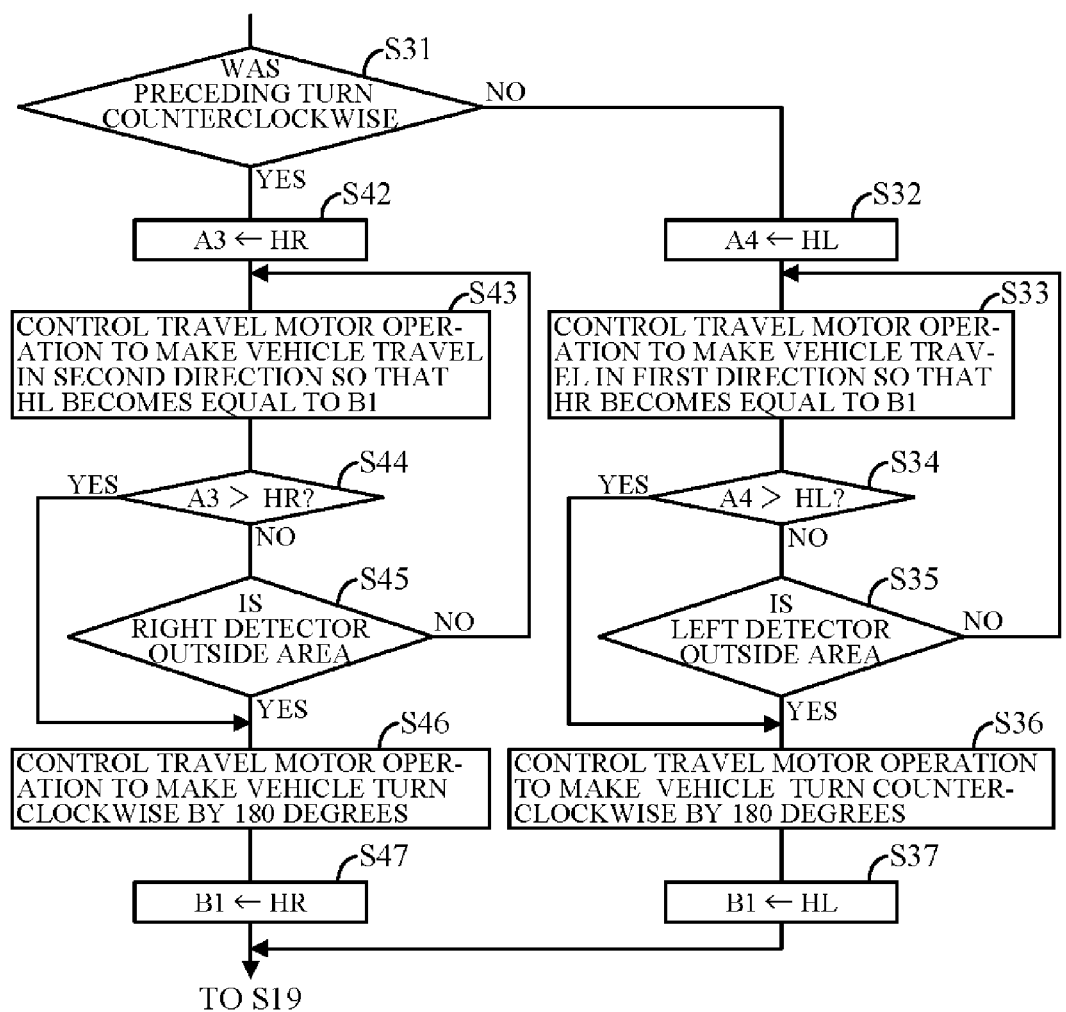
FIG. 17 is a second half of the flowchart of showing the example of processing (processing related to parallel driving) executed by the ECU shown in FIG. 7.

The main operations of the ECU 31 are explained next using flowcharts. FIGS. 15 to 17 are flowcharts showing examples of processing executed by the ECU 31. The ECU 31 performs mainly processing related to narrow area travel discrimination (FIG. 15) and processing related to parallel driving after narrow area travel is confirmed (FIGS. 16 and 17).

The processing shown in FIG. 15 is executed in ordinary work mode. First, in S1, minimum magnetic field strength Hmin is initialized (S: processing Step). Specifically, an initial value H0 is assigned to minimum magnetic field strength Hmin. The initial value H0 is set to at least a value greater than minimum magnetic field strength Hmin in FIG. 5. Next, in S2, operation of the travel motors 18 is controlled to make the vehicle 1 travel straight forward.

Next, in S3, minimum magnetic field strength Hmin is updated. For example, when variation of detected value H of the right magnetic field strength detector 40R is 0 or nearly 0 and detected value H of the right magnetic field strength detector 40R is smaller than minimum magnetic field strength Hmin (assigned initial value H0 at start of control), minimum magnetic field strength Hmin is updated to such detected value H.

In addition, when variation of detected value H of the left magnetic field strength detector 40L is 0 or nearly 0 and detected value H of the left magnetic field strength detector 40L is smaller than minimum magnetic field strength Hmin, minimum magnetic field strength Hmin is updated to such detected value H. As a result, the minimum value of magnetic field strength H during straight forward travel of the vehicle 1, outside the peaking range, is assigned as minimum magnetic field strength Hmin.

Next, in S4, it is determined whether a condition of minimum magnetic field strength Hmin being greater than the predefined threshold value Hb has continued for the predetermined time period Δt. This is to discriminate whether the vehicle 1 has entered along the longitudinal direction of the narrow area AR1 as seen in FIG. 13, for example.

When the result in S4 is NO, the program goes to S5, in which it is determined whether the magnetic field strength detectors 40L or 40R has gone outside the working area AR, i.e., whether detected value H of the magnetic field strength detectors 40L or 40R has become 0 or less. When the result in S5 is NO, the program returns back to S2 and the same processing is repeated until the result in S5 is YES.

When the result in S5 is YES, the program goes to S6, in which it is determined whether minimum magnetic field strength Hmin set in S3 in the present cycle is greater than the threshold value Ha and minimum magnetic field strength Hmin in the preceding cycle is greater than the threshold value Ha. This is to determine whether, as seen in FIG. 8 for example, minimum magnetic field strength Hmin is greater than the threshold value Ha in both of two consecutive straight forward travel sections (position P1 to P2, and position P2 to P3), more specifically to determine whether the vehicle 1 is traveling in the narrow area.

When the result in S6 is NO, the program goes to S7. In the initial condition, preceding cycle minimum magnetic field strength Hmin is set to an initial value greater than the threshold value Ha, so that the program goes to S7 even when minimum magnetic field strength Hmin set in S3 is greater than the threshold value Ha, because preceding cycle minimum magnetic field strength Hmin>Ha is not satisfied.

In S7, the minimum magnetic field strength Hmin during straight forward travel updated in S3 is set as preceding cycle minimum magnetic field strength Hmin. Next, in S8, operation of the travel motors 18 is controlled to make the vehicle 1 turn toward the inside of the working area AR. This processing is performed by, for example, operating the vehicle 1 to keep turning until a randomly predefined turning time has passed. As a result, the vehicle 1 travels randomly in the working area AR. The program next returns to S1 to repeat the same processing.

On the other hand, when the result in S4 is YES or when the result in S6 is YES so that the vehicle 1 is determined to be traveling in the narrow area, the program goes to S9, in which a counter value c is reset to 0 as a preparatory step for starting parallel driving, whereafter the program goes to S11 of FIG. 16.

Figure 18:
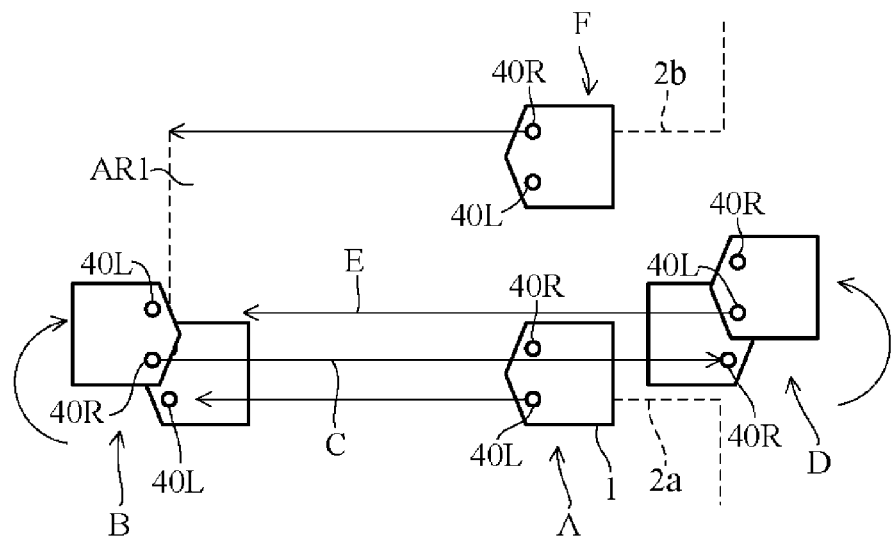
FIG. 18 is a diagram for explaining driving operation of the utility vehicle in the processing of FIGS. 16 and 17.

FIG. 18 is a diagram for explaining parallel driving operation of the vehicle 1 in the narrow area AR1 between the mutually facing wire segment 2a and wire segment 2b. Flowcharts of FIG. 16 and FIG. 17 are explained below with reference to FIG. 18. In the following, in order to distinguish between detected values H of the left and right magnetic field strength detectors 40L and 40R, detected value of the left magnetic field strength detector 40L is designated HL and detected value of the right magnetic field strength detector 40R as HR.

In S11 of FIG. 16, it is determined based on detected value HL of the left magnetic field strength detector 40L whether the left magnetic field strength detector 40L is outside the working area AR, specifically whether detected value HL has become negative. When the result in S11 is YES, the program goes to S12, in which operation of the travel motors 18 is controlled to make the left magnetic field strength detector 40L position over the boundary wire 2 (wire segment 2a) and to make the vehicle 1 turn to be parallel to the wire segment 2a, as shown at A in FIG. 18, and the detected value HR of the right magnetic field strength detector 40R at this time is stored in memory as a threshold value A1.

Next, in S13, operation of the travel motors 18 is controlled to make the vehicle 1 travel straight forward while monitoring detected value HL of the left magnetic field strength detector 40L so that the left magnetic field strength detector 40L moves along above the wire segment 2a, i.e., the detected value of the left magnetic field strength detector 40L remains at 0.

Next, in S14, it is determined whether detected value HR of the right magnetic field strength detector 40R is smaller than the threshold value A1 set in S12. When the vehicle 1 is traveling in the narrow area AR1, detected value HR is equal to or greater than the threshold value A1, so the result in S14 is NO and the program goes to S15.

In S15, it is determined whether the right magnetic field strength detector 40R is outside the working area AR based on detected value HR of the right magnetic field strength detector 40R.

When the result in S15 is NO, it returns to S13. But, when the result in S15 is YES, the program goes to S16, in which operation of the travel motors 18 is controlled to make the vehicle 1 turn clockwise by 180 degrees around the right magnetic field strength detector 40R at the center as shown at B in FIG. 18 in such a manner that the detected value HR of the right magnetic field strength detector 40R is stabilized. By this, the vehicle 1 reverses direction and shifts a predetermined amount in the laterally inward direction of the narrow area AR1 (toward wire segment 2b).

Here, when the vehicle 1 reaches an end of the narrow area AR1, since detected value HR falls below the threshold value A1, the result in S14 becomes YES, whereupon the program skips S15 and goes to S16.

The turning angle of the vehicle 1 is obtained by using the ECU 31 to time-integrate the angular velocity detected from the output of the angular velocity sensor 32, and the travel controlling unit 311 monitors the detection value of the angular velocity sensor 32 while feedback controlling the left and right travel motors 18L and 18R so as to achieve the turning angle of 180 degrees.

Next, in S17, current detected value HR of the right magnetic field strength detector 40R is stored in memory as the reference value B1. The reference value B1 is later updated by processing in S27, S37 and S47 discussed later. Next, in S18, counter value c is incremented by 1 (c=c+1), whereafter the program goes to S19.

In S19, it is determined whether the counter value c is smaller than 2. This is to determine whether the vehicle 1 has traveled above the boundary wire 2 twice, namely, whether the vehicle 1 has traveled along both of the wire segments 2a and 2b as it would upon completing travel over the entirety of the narrow area AR1. When the result in S19 is YES, i.e., when it is determined that narrow area travel has been completed, the program returns to S1 of FIG. 15.

On the contrary, when the result in S19 is NO, the program returns to S11. For example, after the vehicle 1 turns clockwise by 180 degrees, the result in S11 is NO because the left magnetic field strength detector 40L is not outside the narrow area AR1, and the program goes to S21.

In S21, it is determined whether the right magnetic field strength detector 40R is outside the working area AR, specifically, whether detected value HR has become negative based on detected value HR of the right magnetic field strength detector 40R. For example, after the vehicle 1 turns clockwise by 180 degrees, the result in S21 is NO because the right magnetic field strength detector 40R is not outside the working area AR, and the program goes to S31 of FIG. 17.

Explaining this prior to the processing in S22 and on, in S31, it is determined whether the turn in the preceding cycle was counterclockwise. For example, after the vehicle 1 turns clockwise by 180 degrees, as shown at B of FIG. 18, the result in S31 is NO, and the program goes to S32.

In S32, detected value HL of the left magnetic field strength detector 40L is stored in memory as a threshold value A4. Next, in S33, operation of the travel motors 18 is controlled to make the vehicle 1 travel in a first direction straight forward in parallel to the boundary wire 2 (direction shown by arrow C in FIG. 18), while monitoring the detected value HR of the right magnetic field strength detector 40R, so that detected value HR of the right magnetic field strength detector 40R becomes equal to the reference value B1 of the right magnetic field strength detector 40R stored during processing after clockwise turning in the preceding cycle (in S17, for example).

Next, in S34, it is determined whether detected value HL of the left magnetic field strength detector 40L is smaller than the threshold value A4 set in S32. When the vehicle 1 is traveling in the narrow area AR1, detected value HL is equal to or greater than the threshold value A4, so the result in S34 is NO, and the program goes to S35, in which it is determined whether the left magnetic field strength detector 40L is outside the working area AR based on detected value HL of the left magnetic field strength detector 40L.

When the result in S35 is NO, it returns to S33. But when the result is YES, the program goes to S36, in which operation of the travel motors 18 is controlled to make the vehicle 1 turn counterclockwise by 180 degrees around the left magnetic field strength detector 40L at the center as shown at D in FIG. 18 in such a manner that the detected value HL of the left magnetic field strength detector 40L is stabilized. By this, the vehicle 1 reverses direction and shifts a predetermined amount toward the wire segment 2b. Next, in S37, the reference value B1 is updated to current detected value HL of the left magnetic field strength detector 40L and stored in memory, whereafter the program goes to S19.

When the vehicle 1 reaches the end of the narrow area AR1, since the detected value HL falls below the threshold value A4, the result in S34 becomes YES, whereupon the program skips S35 and goes to S36.

On the other hand, after the vehicle 1 turns counterclockwise as shown at D in FIG. 18, the result in S31 is YES and the program goes to S42. In S42, detected value HR of the right magnetic field strength detector 40R is stored in memory as a threshold value A3.

Next, in S43, operation of the travel motors 18 is controlled to make the vehicle 1 travel in a second direction straight forward in parallel to the boundary wire 2 (direction shown by arrow E in FIG. 18) that is opposite to the first direction, while monitoring the detected value HL of the left magnetic field strength detector 40L, so that detected value HL of the left magnetic field strength detector 40L becomes equal to the reference value B1 of the left magnetic field strength detector 40L stored during processing after counterclockwise turning in the preceding cycle (in S37, for example).

Next, in S44, it is determined whether detected value HR of the right magnetic field strength detector 40R is smaller than the threshold value A3 set in S42. When the vehicle 1 is traveling in the narrow area AR1, detected value HR is equal to or greater than the threshold value A3, so the result in S44 is NO, and the program goes to S45. On the other hand, when the vehicle 1 reaches an end of the narrow area AR1, since detected value HR falls below the threshold value A3, the result in S44 becomes YES, whereupon the program skips S45 and goes to S46.

In S45, it is determined whether the right magnetic field strength detector 40R is outside the working area AR based on the detected value HR of the right magnetic field strength detector 40R. When the result in S45 is NO, it returns to S43, but when the result is YES, the program goes to S46, in which operation of the travel motors 18 is controlled to make the vehicle 1 turn clockwise by 180 degrees around the right magnetic field strength detector 40R at the center so that the detected value HR of the right magnetic field strength detector 40R is constant (stabilized). Next, in S47, the reference value B1 is updated to current detected value HR of the right magnetic field strength detector 40R and stored in memory, whereafter the program goes to S19.

The processing of S31 to S37 and the processing of S42 to S47 are repeated alternately until one or the other of the left and right magnetic field strength detectors 40L and 40R moves outside the wire segment 2b in FIG. 18.

When the right magnetic field strength detector 40R moves outside the wire segment 2b, the result in S21 of FIG. 16 is YES and the program goes to S22. When the left magnetic sensor 40L moves outside the wire segment 2b, the result in S11 is YES, and the processing of S11 to S19 is carried out.

In S22, operation of the travel motors 18 is controlled to make the right magnetic field strength detector 40R position over the boundary wire 2 (wire segment 2b) and to make the vehicle 1 turn parallel to the wire segment 2b, as shown at F in FIG. 18, and the detected value HL of the left magnetic field strength detector 40L at this time is stored in memory as a threshold value A2.

Next, in S23, operation of the travel motors 18 is controlled to make the vehicle 1 travel straight forward and to move the right magnetic field strength detector 40R along above the wire segment 2b by monitoring the detected value HR of the right magnetic field strength detector 40R.

Next, in S24, it is determined whether the detected value HL of the left magnetic field strength detector 40L is smaller than the threshold value A2 set in S22. When the vehicle 1 is traveling in the narrow area AR1, the detected value HL is equal to or greater than the threshold value A2, so the result in S24 is NO, and the program goes to S25.

In S25, it is determined whether the left magnetic field strength detector 40L is outside the working area AR based on detected value HL of the left magnetic field strength detector 40L. When the result in S25 is NO, the program returns to S23, but when the result is YES, it goes to S26, in which operation of the travel motors 18 is controlled to make the vehicle 1 turn counterclockwise by 180 degrees around the left magnetic field strength detector 40L at the center in such a manner that detected value HL of the left magnetic field strength detector 40L is made stable. By this, the vehicle 1 reverses direction and shifts a predetermined amount in the laterally inward direction of the narrow area AR1 (toward wire segment 2a).

Here, when the vehicle 1 reaches the end of the narrow area AR1, since detected value HL falls below the threshold value A2, the result in S24 becomes YES, whereupon the program skips S25 and then goes to S26.

Next, in S27, current detected value HL of the left magnetic field strength detector 40L is stored in memory as the reference value B1. Next, in 528, the counter value c is incremented by 1, whereafter the program goes to S19. When travel above the two wire segments 2a and 2b is completed, the counter value c becomes 2, so that the result in S19 is YES and the program returns to S1. The foregoing completes the parallel driving in the narrow area AR1.

As mentioned above, the embodiment is configured to have an apparatus and method for controlling operation of an autonomously navigating turnable utility vehicle (1) equipped with a body (10) and a prime mover (18) mounted on the body to make the vehicle travel about a working area (AR) delineated by a boundary wire (2) laid thereat in order to work autonomously, the working area including a first area (AR1) and a second area (AR2, AR3) connected to the first area, a distance (W1) between mutually facing segments (2a, 2b) of the boundary wire in the first area being equal to or less than a predetermined value (Wa) over a predetermined length (La), a distance (W2, W3) between mutually facing segments of the boundary wire in the second area being greater than the predetermined value, comprising: a magnetic field strength detector (40) installed on the body to detect a magnetic field strength (H) generated by electric current passing through the boundary wire; a travel controlling unit (311) configured to control the prime mover to make the vehicle turn and travel straight forward every time the vehicle traveling in the working area reaches the boundary wire, based on the magnetic field strength detected by the magnetic field strength detector; and a first area discriminating unit (312) configured to discriminate that the vehicle travels in the first area when the magnetic field strength detected by the magnetic field strength detector is kept to be greater than a threshold value (Ha, Hb) predefined based on a minimum value of the magnetic field strength in the first area for a first time period from a first turn to a second turn of the vehicle, or when the magnetic field strength detected by the magnetic field strength detector is kept to be greater than the threshold value for a predetermined time period ($\Delta t$) after the first turn.

Specifically, in the apparatus and method, the magnetic field strength detector (40) comprises a first magnetic field strength detector (40R) and a second magnetic field strength detector (40L) installed spaced apart from each other in a vehicle lateral direction, and the first area discriminating unit (312) discriminates that the vehicle (1) travels in the first area (AR1) when it is determined that outputs (H) of the first and second magnetic field strength detectors (40R, 40L) are kept to be greater than a first one (Ha) of the threshold value (Ha, Hb) predefined based on the minimum value of the magnetic field strengths (H) in the first area (AR1) continuously for the first time period from the first turn to the second turn of the vehicle (1), or when it is determined that the outputs (H) of the first and second magnetic field strength detectors (40R, 40L) are kept to be greater than a second one (Hb) of the threshold value (Ha, Hb) continuously for the second predetermined time period ($\Delta t$) since the first turn.

Thus in the present embodiment, by focusing on the point that minimum value Hmin of magnetic field strength in the first (narrow) area AR1 is greater than minimum value of magnetic field strength in the second (broad) area AR2 (AR3), first (narrow) area travel of the vehicle 1 is determined based on magnitude relationship between minimum magnetic field strength Hmin detected from the output of the magnetic field strength detectors 40L and 40R and the threshold values Ha and Hb. First area travel of the vehicle 1 can therefore be favorably determined with a simple configuration not requiring use of a GPS (position) sensor, geomagnetic field sensor or other costly position sensor or mapping of the working area AR. As a result, switching is possible to a working mode optimum for the first area AR1 (parallel driving mode) that enables the vehicle 1 to work efficiently in the first area AR1.

In the apparatus and method, the first area discriminating unit configured to discriminate that the vehicle travels in the first area when the magnetic field strength detected by the magnetic field strength detector is kept to be greater than the threshold value for the first time period and is further kept to be greater than the threshold value for a second time period from the second turn to a third turn of the vehicle.

By in this manner determining that travel is in the first (narrow) area when minimum magnetic field strength Hmin is determined to be greater than the threshold value Ha in both of two consecutive straight forward travel sections, in addition to the advantages and effects mentioned above, it is possible for the first area discriminating unit 312 to discriminate first area travel accurately without, when the vehicle 1 is traveling in a corner region of the second (board) area AR3 as shown in FIG. 11, falsely discriminating it to be the first area AR1.

In the apparatus and method, the threshold value is an average value of the minimum value of the magnetic field strength in the first area and a maximum value of the magnetic field strength in the second area.

With this, in addition to the advantages and effects mentioned above, the narrow area AR1 can be reliably discriminated and first area travel can be accurately determined without falsely discriminating that the second area AR2 or AR2 is the first area AR1.

In the apparatus and method, the travel controlling unit is configured to control the prime mover to make the vehicle travel in the first area along the boundary wire based on the magnetic field strength detected by the magnetic field detector, when the first area discriminating unit discriminates that the vehicle travels in the first area.

Figure 19:
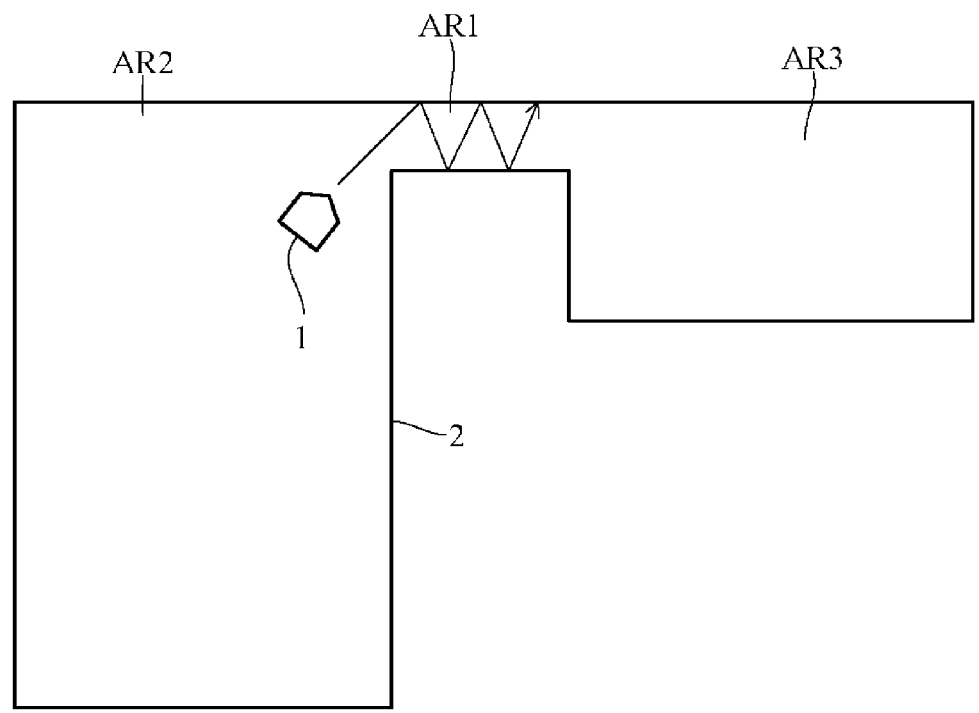
FIG. 19 is a diagram showing a comparison example of FIG. 8.

By controlling the prime mover (travel motors) 18 so that the vehicle 1 travels through the narrow area AR1 in parallel with the boundary wire 2 in this manner, in addition to the advantages and effects mentioned above, incomplete mowing, excessive mowing and the like of lawn in the narrow area AR1 can be prevented to enable good work performance. Specifically, in the case of random travel in the narrow area AR1, as shown in FIG. 19, for example, not only does the vehicle 1 turn repeatedly and take extra time to pass through the narrow area but the likelihood of incomplete or excessive lawn mowing also arises. On this point, since the vehicle 1 is made to perform parallel travel after narrow area travel confirmation, repeated turning in the narrow area AR1 can be prevented to enable efficient work.

In the apparatus and method, the first area discriminating unit is configured to discriminate whether the vehicle traveling in the first area along the boundary wire reaches an end of the first area based on the magnetic field strength detected by the magnetic field strength detector, and the travel controlling unit is configured to control the prime mover to make the vehicle travel along the boundary wire in a first direction when the vehicle is discriminated not to reach the end of the first area, and then to make the vehicle travel in a second direction opposite to the first direction with the vehicle shifted laterally by a predetermined amount in the first area when the vehicle is discriminated to reach the end of the first area.

By driving the vehicle 1 back and forth while shifting it in the lateral direction of the area at the ends of the narrow area AR1 in this manner, in addition to the advantages and effects mentioned above, lawn mowing can be performed thoroughly throughout the narrow area AR1.

The apparatus and method, further comprising a setting unit (313) configured to set a reference value (B1), wherein the magnetic field strength detector comprises a first magnetic field strength detector (40R) and a second magnetic field strength detector (40L) installed spaced apart from each other in a lateral direction of the vehicle, the travel controlling unit is configured to control the prime mover to make the vehicle travel in the first direction so that a magnetic field strength (HR) detected by the first magnetic field strength detector is kept to be the reference value, and to make the vehicle travel in the second direction so that a magnetic field strength (HL) detected by the second magnetic field strength detector is kept to be the reference value, and the first area discriminating unit is configured to discriminate whether the vehicle reaches the end of the first area based on the magnetic field strength detected by the second magnetic field strength detector when the vehicle travels in the first direction, and discriminates whether the vehicle reaches the end of the first area based on the magnetic field strength detected by the first magnetic field detector when the vehicle travels in the second direction.

Thus in the present embodiment, the vehicle 1 is driven straight forward in the narrow area AR1 using detected value H of one magnetic field strength detector (40R, for example) and whether the vehicle 1 reaches an end of the narrow area AR1 is discriminated using detected value H of the other magnetic field strength detector (40L, for example). Therefore, in addition to the advantages and effects mentioned above, processing in the ECU 31 is easy and stable parallel driving of the vehicle 1 can be achieved.

Although the present embodiment is configured such that the vehicle 1 is driven by the prime mover comprising a pair of travel motors 18L, 18R, it may be configured such that the vehicle 1 can be driven by other prime mover such as an internal combustion engine.

Although the present embodiment is configured such that the a pair of magnetic field detectors 40L, 40R are installed laterally symmetrically with respect to the center line C running in the straight forward direction along the widthwise center of the vehicle 1, the arrangement of the detectors can be changed as desired.

Although the present embodiment is configured such that the turning angle of the vehicle 1 is obtained by time-integrating outputs of the angular velocity sensor 32, it may be configured such that the turning angle is immediately detected.

Although the present embodiment is configured to drive the vehicle 1 straight forward at random, it is alternatively possible to drive the vehicle 1 parallel to the boundary wire 2 in the broad areas AR2, AR3 such that the vehicle turns and travels straight every time it reaches the boundary wire 2.

Although the present embodiment is configured such that the minimum magnetic field strength Hmin is updated and it is determined whether the vehicle 1 is traveling in the narrow area by comparing the value Hmin with the threshold value Ha in S4 and S6, the detected value H of the magnetic field strength detectors 40 can be immediately used as a value to be compared with the threshold value Ha to determine whether the vehicle 1 is traveling in the narrow area.

It can also be configured such that the vehicle 1 is discriminated to be traveling in the narrow area (AR1) when the detected value (H) of the magnetic field strength detector (40) is kept to be greater than the first threshold value (Ha) for a time period from the first turn to the second turn (from position P1 to P2 in FIG. 8), or for a next time period from the second turn to the third turn (from position P2 to P3 in FIG. 8). More specifically, it can be configured such that the vehicle 1 is discriminated to be traveling the narrow area AR1 when the minimum magnetic field strength Hmin at these positions is greater than the threshold value Ha.

At any rate, the arrangement can be modified if can discriminate that the vehicle 1 is traveling in the narrow area AR1 when it is determined that the detected value H of the magnetic field strength detector 40 is kept to be greater than the first threshold value Ha predefined based on the minimum value of the magnetic field strength Hmin) in the narrow area AR1 continuously for a first time period from the first turn to the second turn, or when it is determined that the detected value H of the magnetic field strength detector 40 is kept to be greater than the second threshold value Hb) continuously for the second predetermined time period ($\Delta t$) since the first turn.

Although the present embodiment is configured such that the first threshold value Ha is predefined as an average value of the minimum value Hmin of the magnetic field strength H in the narrow area AR1 and the maximum value of the magnetic field strength H in the broad area AR2, AR3, it should not be limited thereto. For example, if the minimum value Hmin is smaller than the maximum value in the broad area AR2, AR3, the threshold value Ha can be predefined as a product obtained by multiplying the minimum value Hmin by a coefficient (that is greater than 0, but is smaller than 1) or as a difference obtained by subtracting a predetermined value from the minimum value Hmin.

It should be noted in the above that, although the present embodiment is applied for a lawn mower for lawn or grass mowing work, it may applied to any other type of autonomously navigating utility vehicle.

It should also be noted that the above embodiment and one or more of the modifications can be freely combined.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of an autonomously navigating turnable utility vehicle equipped with a body and a prime mover mounted on the body to make the vehicle travel about a working area delineated by a boundary wire laid thereat in order to work autonomously, the working area including a first area and a second area connected to the first area, a distance between mutually facing segments of the boundary wire in the first area being equal to or less than a predetermined value over a predetermined length, a distance between mutually facing segments of the boundary wire in the second area being greater than the predetermined value, the apparatus comprising:

a magnetic field strength detector installed on the body to detect a magnetic field strength generated by electric current passing through the boundary wire;

a travel controlling unit configured to control the prime mover to make the vehicle turn and travel straight forward every time the vehicle traveling in the working area reaches the boundary wire, based on the magnetic field strength detected by the magnetic field strength detector;

a value setting unit configured to establish a threshold value that is less than a minimum value of a total magnetic field strength obtained by adding the magnetic field strengths generated by the mutually facing segments of the boundary wire in the first area, and is greater than a maximum value of the magnetic field strength generated by each of the mutually facing segments individually; and a first area discriminating unit configured to discriminate that the vehicle travels in the first area when the magnetic field strength detected by the magnetic field strength detector is kept to be greater than the threshold value for a first time period from a first turn to a second turn of the vehicle, or when the magnetic field strength detected by the magnetic field strength detector is kept to be greater than the threshold value for a predetermined time period after the first turn.

2. The apparatus according to claim 1, wherein to discriminate that the vehicle travels in the first area when the magnetic field strength is kept to be greater than the threshold value for the first time period, the first area discriminating unit is configured to discriminate that the vehicle travels in the first area when the magnetic field strength detected by the magnetic field strength detector is kept to be greater than the threshold value for the first time period and is further kept to be greater than the threshold value for a second time period from the second turn to a third turn of the vehicle.

3. The apparatus according to claim 1, wherein the value setting unit configured is to establish the threshold value as an average value of the minimum value of the total magnetic field strength and the maximum value of the magnetic field strength generated by each of the mutually facing segments individually.

4. The apparatus according to claim 1, wherein the magnetic field strength detector comprises a first magnetic field strength detector and a second magnetic field strength detector installed spaced apart from each other in a lateral direction of the vehicle, and the first area discriminating unit is configured to discriminate that the vehicle travels in the first area when a sum of a magnetic field strength detected by the first magnetic field strength detector and a magnetic field strength detected by the second magnetic field strength detector is greater than the threshold value for the first time period, or when the sum of a magnetic field strength detected by the first magnetic field strength detector and a magnetic field strength detected by the second magnetic field strength detector is greater than the threshold value for the predetermined time period.

5. The apparatus according to claim 1, wherein the travel controlling unit is configured to control the prime mover to make the vehicle travel in the first area along the boundary wire based on the magnetic field strength detected by the magnetic field detector, when the first area discriminating unit discriminates that the vehicle travels in the first area.

6. The apparatus according to claim 5, wherein the first area discriminating unit is configured to discriminate whether the vehicle traveling in the first area along the boundary wire reaches an end of the first area based on the magnetic field strength detected by the magnetic field strength detector, and the travel controlling unit is configured to control the prime mover to make the vehicle travel along the boundary wire in a first direction when the vehicle is discriminated not to reach the end of the first area, and then to make the vehicle travel in a second direction opposite to the first direction with the vehicle shifted laterally by a predetermined amount in the first area when the vehicle is discriminated to reach the end of the first area.

7. The apparatus according to claim 6, wherein the value setting unit is configured to set a reference value, the magnetic field strength detector comprises a first magnetic field strength detector and a second magnetic field strength detector installed spaced apart from each other in a lateral direction of the vehicle, the travel controlling unit is configured to control the prime mover to make the vehicle travel in the first direction so that a magnetic field strength detected by the first magnetic field strength detector is kept to be the reference value, and to make the vehicle travel in the second direction so that a magnetic field strength detected by the second magnetic field strength detector is kept to be the reference value, and the first area discriminating unit is configured to discriminate whether the vehicle reaches the end of the first area based on the magnetic field strength detected by the second magnetic field strength detector when the vehicle travels in the first direction, and discriminates whether the vehicle reaches the end of the first area based on the magnetic field strength detected by the first magnetic field detector when the vehicle travels in the second direction.

8. A method for controlling operation of an autonomously navigating turnable utility vehicle equipped with a body and a prime mover mounted on the body to make the vehicle travel about a working area delineated by a boundary wire laid thereat in order to work autonomously, the working area including a first area and a second area connected to the first area, a distance between mutually facing segments of the boundary wire in the first area being equal to or less than a predetermined value over a predetermined length, a distance between mutually facing segments of the boundary wire in the second area being greater than the predetermined value, the vehicle including a magnetic field strength detector installed on the body to detect a magnetic field strength generated by electric current passing through the boundary wire, the method comprising the steps of:

controlling the prime mover to make the vehicle turn and travel straight forward every time the vehicle traveling in the working area reaches the boundary wire, based on the magnetic field strength detected by the magnetic field strength detector;

establishing a threshold value that is less than a minimum value of a total magnetic field strength obtained by adding the magnetic field strengths generated by the mutually facing segments of the boundary wire in the first area, and is greater than a maximum value of the magnetic field strength generated by each of the mutually facing segments individually; and discriminating that the vehicle travels in the first area when the magnetic field strength detected by the magnetic field strength detector is kept to be greater than the threshold value for a first time period from a first turn to a second turn of the vehicle, or when the magnetic field strength detected by the magnetic field strength detector is kept to be greater than the threshold value for a predetermined time period after the first turn.

9. The method according to claim 8, wherein discriminating that the vehicle travels in the first area when the magnetic field strength is kept to be greater than the threshold value for the first time period comprises discriminating that the vehicle travels in the first area when the magnetic field strength detected by the magnetic field strength detector is kept to be greater than the threshold value for the first time period and is further kept to be greater than the threshold value for a second time period from the second turn to a third turn of the vehicle.

10. The method according to claim 8, wherein establishing the threshold value comprises establishing the threshold value as an average value of the minimum value of the total magnetic field strength and the maximum value of the magnetic field strength generated by each of the mutually facing segments individually.

11. The method according to claim 8, wherein the magnetic field strength detector comprises a first magnetic field strength detector and a second magnetic field strength detector installed spaced apart from each other in a lateral direction of the vehicle, and the step of discriminating includes discriminating that the vehicle travels in the first area when a sum of a magnetic field strength detected by the first magnetic field strength detector and a magnetic field strength detected by the second magnetic field strength detector is greater than the threshold value for the first time period, or when the sum of a magnetic field strength detected by the first magnetic field strength detector and a magnetic field strength detected by the second magnetic field strength detector is greater than the threshold value for the predetermined time period.

12. The method according to claim 8, wherein the step of controlling includes controlling the prime mover to make the vehicle travel in the first area along the boundary wire based on the magnetic field strength detected by the magnetic field detector, when it is discriminated that the vehicle travels in the first area in the step of discriminating.

13. The method according to claim 12, wherein the step of discriminating includes discriminating whether the vehicle traveling in the first area along the boundary wire reaches an end of the first area based on the magnetic field strength detected by the magnetic field strength detector, and the step of controlling includes controlling the prime mover to make the vehicle travel along the boundary wire in a first direction when the vehicle is discriminated not to reach the end of the first area, and then to make the vehicle travel in a second direction opposite to the first direction with the vehicle shifted laterally by a predetermined amount in the first area when the vehicle is discriminated to reach the end of the first area.

14. The method according to claim 13, further comprising the step of setting a reference value, wherein
the magnetic field strength detector comprises a first magnetic field strength detector and a second magnetic field strength detector installed spaced apart from each other in a lateral direction of the vehicle,
the step of controlling includes controlling the prime mover to make the vehicle travel in the first direction so that a magnetic field strength detected by the first magnetic field strength detector is kept to be the reference value, and to make the vehicle travel in the second direction so that a magnetic field strength detected by the second magnetic field strength detector is kept to be the reference value, and
the step of discriminating includes discriminating whether the vehicle reaches the end of the first area based on the magnetic field strength detected by the second magnetic field strength detector when the vehicle travels in the first direction, and discriminates whether the vehicle reaches the end of the first area based on the magnetic field strength detected by the first magnetic field detector when the vehicle travels in the second direction.

* * * * *